Feb. 1, 1927.
O. N. BRATVOLD
1,616,252
HYDRAULIC DRIVE
Filed March 6, 1926     2 Sheets-Sheet 1
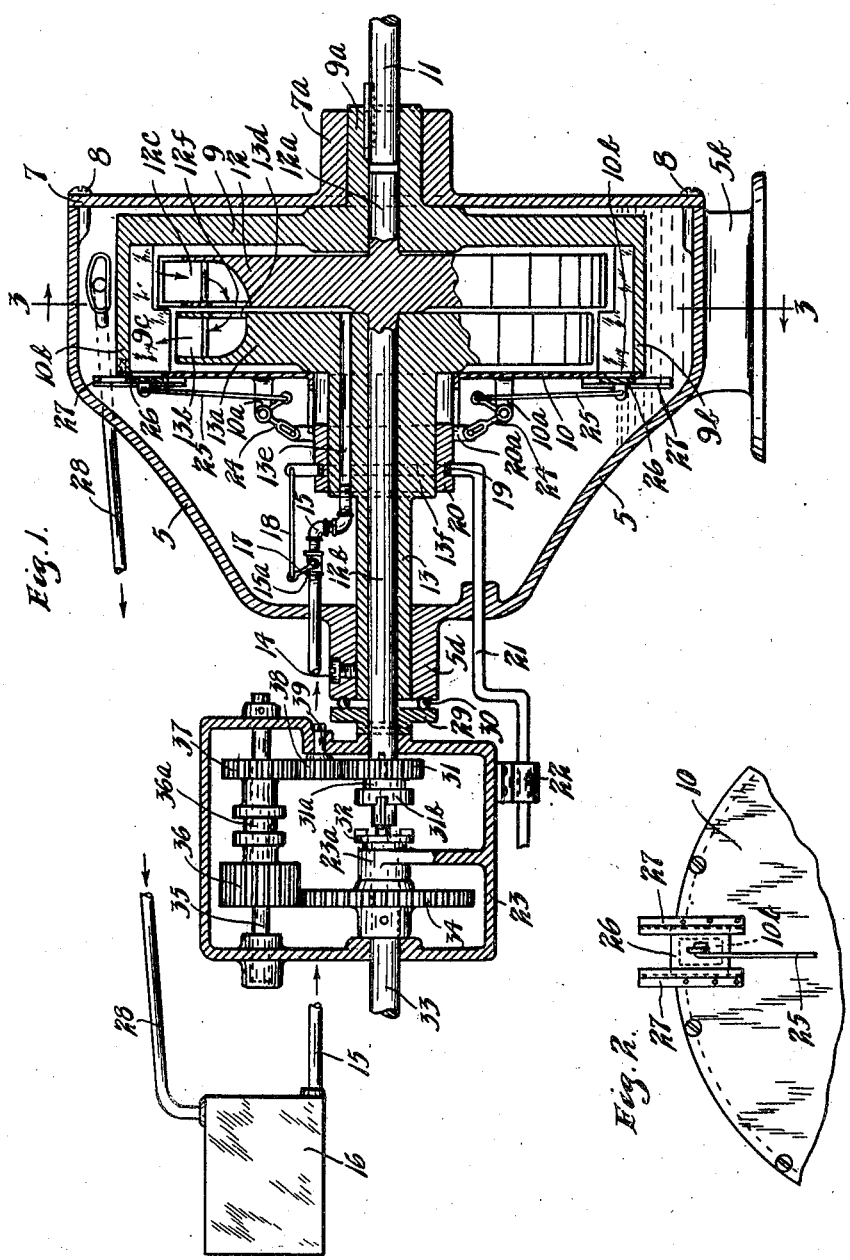
INVENTOR.
OSCAR N. BRATVOLD.
BY HIS ATTORNEYS.

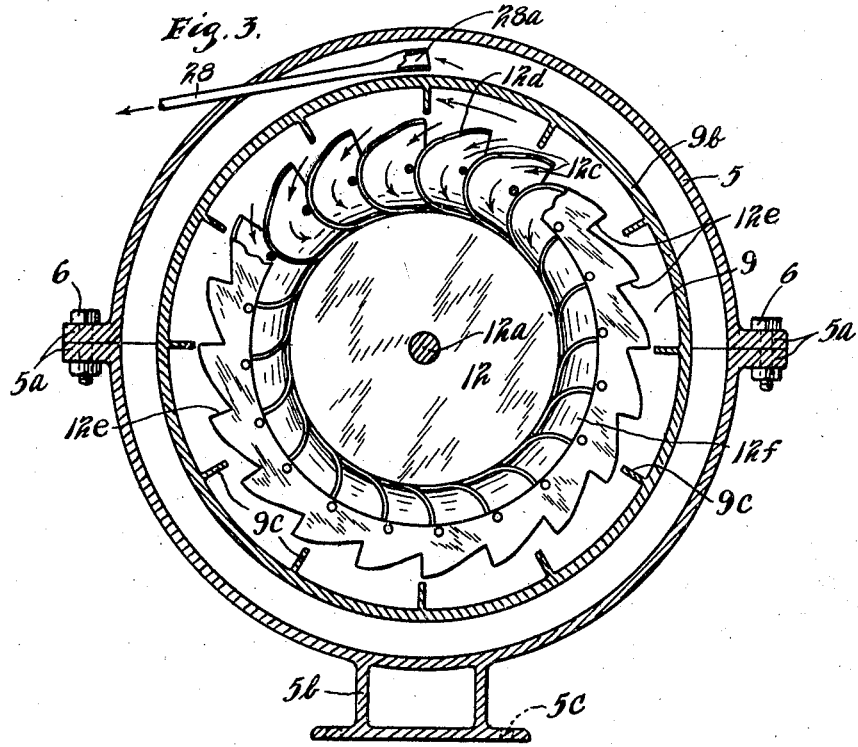
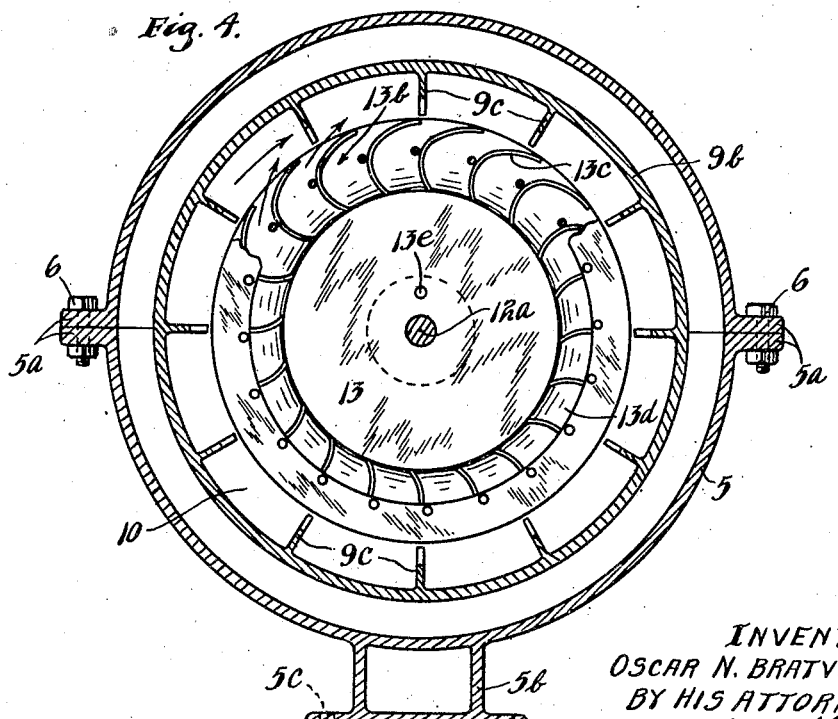

Patented Feb. 1, 1927.

1,616,252

UNITED STATES PATENT OFFICE.

OSCAR N. BRATVOLD, OF WAYZATA, MINNESOTA.

HYDRAULIC DRIVE.

Application filed March 6, 1926. Serial No. 92,724.

This invention relates to a transmission device, and particularly to such a device using a liquid as a transmitting medium between certain parts thereof. While the invention is applicable to various structures, it is particularly designed for driving one part from another and has a high degree of utility when used as a transmission mechanism between the motor of an automobile and the parts driven thereby. In the modern automobile the motor is connected and disconnected from the transmission mechanism by a clutch, and a set of speed changing and reversing gears are usually employed to give several forward speeds and one or more reverse speeds.

It is an object of this invention to provide a hydraulic or liquid transmission device adapted, among other uses, to be used between the motor and transmission mechanism of an automobile comprising a driven member and a driving member, the driven member being impelled by a liquid and adapted to be driven at various speeds.

It is a further object of the invention to provide a transmission device comprising a rotatable member in the form of a casing or drum, having an internal periphery with vanes thereon and a rotatable member with an external periphery provided with passages thereat and adjacent said vanes, adapted to be driven by said first mentioned member, a stationary member being provided having passages therethrough, said first mentioned member containing a liquid forming the connecting means between said rotatable members, which liquid is circulated through said stationary member, said casing formed by said first mentioned member being provided with a valve adapted to open a vent from said casing either to drain the same or to regulate the amount of the oil therein.

It is more specifically an object of the invention to provide a device as set forth in the preceding paragraph, which members are surrounded by a casing adapted to contain oil, together with operating means for said valve and means for supplying oil to said casing formed by said first mentioned member through said stationary member.

These and other objects and advantages of the invention will be fully set forth in the following description made in connection with the accompanying drawings, in which like reference characters refer to the same parts throughout the different views and in which:—

Fig. 1 is a view in central vertical section through the device, showing an oil reservoir in side elevation;

Fig. 2 is a partial view in front elevation of one of the members with the valve carried thereby;

Fig. 3 is a view in vertical section taken on line 3—3 of Fig. 1 looking in the direction of the arrow at the top of said figure, and Fig. 4 is a view in vertical section also taken on line 3—3 of Fig. 1, looking in the direction of the arrow at the bottom of said line.

Referring to the drawings, a casing 5 is shown, which preferably will be of the divided type such as ordinarily used for the crank casing of an automobile engine and connected through the lugs $5^a$ by suitable bolts 6. Casing 5 may be provided with a base $5^b$ provided with suitable holes $5^c$ by which it may be attached to the frame or engine block. Casing 5 preferably is open at one end and a plate like member 7 is provided, adapted to close said end and be held in place by suitable cap screws 8 extending into circumferentially spaced lugs on casing 5. The member 7 has a central hub $7^a$ bored to have journaled therein the hub $9^a$ of the rotatable member 9 disposed in casing 5, which member 9 has a disk like side portion and a circumferentially extending flange $9^b$. The member 9 thus forms a shell or drum and said member is closed by a plate 10 secured to the outer end of flange $9^b$ by circumferentially spaced screws preferably having their heads countersunk in the plate 10. The member 9 has a plurality of transversely extending vanes or flanges $9^c$ projecting inwardly from the internal periphery of flange $9^b$. In the embodiment of the invention illustrated, member 9 constitutes a driving member and may be the fly wheel of an automobile engine. Said member is shown as keyed to a driving shaft 11 and while this shaft may be variously driven, it may constitute the crank shaft of an automobile engine. Disposed adjacent the member 9 and within the same, is another rotatable member 12. Member 12 has a shaft $12^a$ projecting toward member 9 journaled in the bore and hub $9^a$ and said member 12 has another shaft $12^b$ projecting from its opposite side, journaled in a stationary member 13, to be later described. The member 12 is substantially in the form of a disk and is provided at its external periphery with a multiplicity of passages 12$^c$, which passages extend circumferentially and inwardly to said disk as shown in Fig. 3 and have surrounding walls 12$^d$ with their faces on substantially radial lines 12$^e$, the edges of said walls being in the plane of the lines 12$^e$ and the passages 12$^c$ having openings which are directed substantially circumferentially or tangentially of the periphery of member 12. The passages 12$^c$ extend inwardly of member 12 and then laterally away from the member 9 and have inner openings 12$^f$ through the side of member 12. The stationary member 13 has a hub at one end journaled in the hub 5$^d$ of casing 5 and kept from rotation by set screw 14 threaded into said hub. The member 13 has a disk like portion 13$^a$ co-axial with and closely adjacent the member 12, said portion 13$^a$ being of somewhat smaller diameter than member 12. Said member 13$^a$ has a multiplicity of passages 13$^b$ at its outer portion separated by the partitions 13$^c$ which extend inwardly in curved form, the outer ends of passages 13$^b$ thus being directed substantially tangentially and between the walls thereof at each side of member 13$^a$. Said passages 13$^b$ also extend laterally at their inner portions toward member 12 and have inner openings 13$^d$ alining radially with the openings 12$^f$ in the member 12. It will be noted that the vanes 9$^c$ extend farther inwardly at one end so that they are spaced substantially the same distance from the outer edges of the members 12 and 13$^a$. The member 13$^a$ has an intermediate hub portion 13$^f$ of greater diameter than that of the hub portion carried in hub 5$^d$ and passage 13$^e$ extends through this intermediate hub having its inner end at the inner face of member 13 and opening into the space between member 12 and 13$^a$. A conduit or pipe 15 is connected to the outer end of passage 13$^e$ and extends through casing 5, said pipe communicating with an oil reservoir 16 to be later described. A valve 15$^a$ is disposed in pipe 15 within the casing 5 adapted to open and close said pipe and is provided with an operating lever 17 connected by a link 18 to a lug on an operating ring 19 disposed in a groove in a collar 20 slidable on the intermediate hub of member 13. The ring 19 has an operating bar 21 connected thereto slidable through one end of the casing 5 and also shown as guided in and slidable in the bearing 22 secured to one side of the gear casing 23. The collar 20 has a plurality of projecting lugs or arms 20$^a$ having pivotally connected thereto the slotted ends of bell crank levers 24 journaled in suitable brackets 10$^a$ carried by the plate 10. The other arms of the bell crank levers 24 are pivotally connected to links 25 which are in turn pivotally connected to slide valves 26 mounted in guide members 27 secured at opposite sides of the plate 10, said valves 26 being adapted to close and uncover the openings 10$^b$ formed through plate 10 adjacent the inner periphery of the flange 9$^b$ and the vanes 9$^c$. While any number of the valves 26 may be used, in the embodiment of the invention illustrated, two of the same are shown. Conduit 28 extends into casing 5 and has an enlarged open ended mouth 28$^a$ disposed closely adjacent the external periphery of flange 9$^b$. Pipe 28 communicates at its other end with the top of the oil reservoir 16, which reservoir will be suitably supported at a height above that of passage 13$^e$. The shaft 12$^b$ has a thrust collar 29 pinned or otherwise secured thereto, which forms one end of the thrust bearing the other end of which will be formed in or supported by the outer end of the hub 5$^d$, suitable anti-friction members such as the balls 30 being shown between members 29 and 5$^d$. When the transmission device is used with an automobile, it is desirable to have a reverse speed mechanism and for this purpose the gear casing 23 is provided into which shaft 12$^a$ projects, which shaft has secured thereto in said gear casing, the gear 31 having a groove 31$^a$ adapted to receive a shift lever and having a half clutch 31$^b$ thereon adapted to engage and drive a half clutch 32 carried on shaft 33. The end of shaft 12$^b$ is reduced and shown as journaled in the end of the transmission shaft 33 journaled in the wall of casing 23 and the bearing 23$^a$ therein. Shaft 33 has secured thereto the gear 34. A jack shaft 35 is journaled in hubs in the wall of casing 23 and carries the gear 36 having a wide face and adapted to mesh with gear 34 and also the gear 37 adapted to mesh with gear 31. The gears 36 and 37 are shown as integrally connected and the shift collar 36$^a$ is disposed therebetween, adapted to be moved by suitable shift lever (not shown) so that gears 36 and 37 can be shifted longitudinally of shaft 35. A gear 38 is provided in casing 23 having a shaft journaled in the wall of casing 23 and held in place by a suitable pin 39 forming an idler gear adapted to mesh with gears 37 and 31, thus giving a reverse drive to shaft 33.

In operation, with the device assembled as described, oil will be placed in reservoir 16. This oil naturally will flow through the pipe 15 into passage 13$^e$ and into the space between members 13$^a$ and 12, which oil will flow to the bottom of member 9. Member 9 will be driven from the shaft 11 and the vanes 9$^c$ will sweep this oil around the member 12. The oil will impinge against the walls 12$^d$ of passages 12$^c$ so that member 12 will be driven. If there is oil in the member 9 to the depth of the width of vanes 9$^c$, a great driving effect will be transmitted to member 12 and this member will approach half the speed of member 9. The oil driven against the motor 12 and its walls 12$^d$ will be directed inwardly in the passages 12$^c$ as shown by the arrows in Figs. 1 and 3. This oil will pass out at the inner ends 12$^f$ of said passages and will be driven across into the openings 13$^d$ of passages 13$^b$ and will be directed outwardly of the passages 13$^b$. The passages 13$^b$, of course, are stationary and the oil will again come in between the vanes 9$^c$ and be carried therewith and again driven against the member 12. It will be noted that the oil is given an impulse by the passages 13$^b$ in the direction of rotation of members 9 and 12. The more oil in the member 9 up to a certain point, the greater will be the driving power of member 9. The amount of oil carried in the member 9 may be regulated by an adjustment of the valves 26 through the member 21. When the device is installed in an automobile, the member 21 will be operated by a pedal or other lever so that a quick and accurate control is had of the valves 26. As the valves 26 move outwardly through the operation of the collar 20 and bell crank levers 24, it will be seen that the openings 10$^b$ will be uncovered from their inner ends. The valves 26 can be moved to entirely uncover the openings 10$^b$, at which time all the oil will be thrown out of and be drained from member 9. The oil leaving member 9 is retained in the crank case 5. The revolution of member 9 in casing 5 will carry some of the oil around therewith and the same will be thrown into the mouth of pipe 28. If desired, the outer side of member 9 could be provided with a roughened surface or small transverse ribs which would assist in taking up the oil. The oil will fall by gravity into the reservoir 16, from which it can again be supplied to the member 9. When the valves 26 are moved to drain the member 9, the valves 17 will be operated so that no oil can enter through pipe 15 when the valves 26 are substantially opened. The speed and power transmitted to member 12 by member 9 can be regulated by movement of the valve 26 by means of a rod 21. All speeds in one direction will therefore be taken care of by adjustment of the valves 26 through the movement of rod 21. When the device is applied to a vehicle such as an automobile, it is desirable to have a reverse speed and this is obtained through the medium of gears 31 and 38 and the gears on shaft 35. As shown in Fig. 1 the gears are set for this reverse speed and shaft 33 will be driven in a direction opposite to shaft 12$^a$ through the idler gear 38. For forward speeds the gears 36 and 31 will be shifted to the left as shown in Fig. 1, so that gear 31 is clutched to member 32 and thus to shaft 33. Motion will thus be transmitted from shaft 12$^b$ through gear 31 to shaft 33.

The gears can also be moved to neutral position by movement to the right of gears 36 and 37 to bring gears 36 and 37 out of mesh respectively with gears 34 and 38. On account of the circulation of oil through the stationary member 13$^a$, there will be a heavy thrust of member 12 to the right as shown in Fig. 1 and for this purpose the thrust collar 29 and members 30 are provided.

With the device shown and described applied to an automobile, no other or mechanical clutch will be necessary and no change of gears for forward speeds will be necessary. The forward speeds will be determined by the load and by the adjustment of valves 26. With the certain amount of oil in the member 9 the device will only be capable of delivering a certain amount of power and if the load exceed this, the driven member 12 will cease to rotate. With the given load and given amount of oil in the member 9 and a constant speed of the engine, the speed of the vehicle will be constant. When it is desired to stop the vehicle, the rod 21 will be moved to completely open the valves 26. The oil in member 9 will be thrown and drained therefrom and valve 16 will be closed so that no more oil can get into the member 9. The driving force is thus removed from the transmission gearing and the vehicle can be stopped as usual with the brakes. It is really not necessary to have a neutral position for the transmission gearing, as the device is in neutral or non-driving position when member 9 is drained. It is sometimes, however, desirable to use the neutral position of the device. The rotation of member 9 will, of course, always provide plenty of oil in reservoir 16.

From the above description it is seen that applicant has provided quite a simple and very efficient transmission device and one having a high degree of utility when used for driving vehicles. The drive is very flexible and the same greatly safeguards the transmission mechanism of the vehicle and prevents undue stress thereon. The device is quite compact and easily installed adjacent the motor on the modern automobile.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:

1. A liquid transmission device comprising a pair of rotatable members, one having an internal periphery with circumferentially spaced transversely extending means and the other having an external periphery with substantially tangentially directed passages extending radially inward and having outer walls adjacent said vanes, one of said members constituting a driving member and the other a driven member, a stationary member adjacent said last mentioned member and having an external periphery with channels leading therefrom and having inner ends adapted to receive from the inner ends of said passages, said first mentioned member forming a casing enclosing said other members and containing liquid, whereby rotation of one of said first mentioned members will rotate the other and said liquid will be circulated through said stationary member.

2. The structure set forth in claim 1 and a valve on said first mentioned member adjacent its internal periphery adapted to provide an opening through said casing extending more or less from said periphery.

3. A liquid transmission device having in combination, a rotatable drum having an interior periphery with circumferentially spaced liquid impelling means thereon, a rotatable member co-axial with said drum having an external periphery adjacent said means and provided with a plurality of circumferentially spaced pockets, said pockets extending inwardly of said last mentioned member and opening at one side thereof, a stationary member mounted adjacent said last mentioned member and of smaller diameter, said stationary member having a series of passages in its external periphery open at their outer ends and extending through the side of said member, adjacent said last mentioned rotatable member, whereby liquid is circulated through said stationary member and said rotatable member is driven.

4. The structure set forth in claim 3, said passages in said stationary member having their outer ends directed oppositely to the outer ends of said pockets.

5. The structure set forth in claim 3, means for supplying liquid to said rotatable members, and regulatable means for the exit of liquid from said drum.

6. The structure set forth in claim 3, a plurality of valves adjacent the internal periphery of said drum, a conduit for supplying liquid to said drum, means for moving said valves and means for closing said conduit when said valves are substantially open.

7. A liquid transmission device comprising a pair of rotatable members, one of which has liquid propelling means adjacent its periphery and the other of which has adjacent its periphery, substantially tangentially directed passages extending inwardly thereof, adapted to receive liquid propelled by said means, the first one of said members constituting a driving member and the other a driven member, a stationary member adjacent said last mentioned member and having outwardly extending channels therein having their inner ends adapted to receive from the inner ends of said passages, said members being constructed and arranged to have liquid retained thereabout whereby rotation of the first one of said first mentioned members will rotate the other and said liquid will be circulated through said stationary member.

In testimony whereof I affix my signature.

OSCAR N. BRATVOLD.